May 17, 1932. W. H. MUZZY 1,858,411
AUTOMOBILE LIQUID LEVEL INDICATOR
Filed June 25, 1923 2 Sheets-Sheet 1
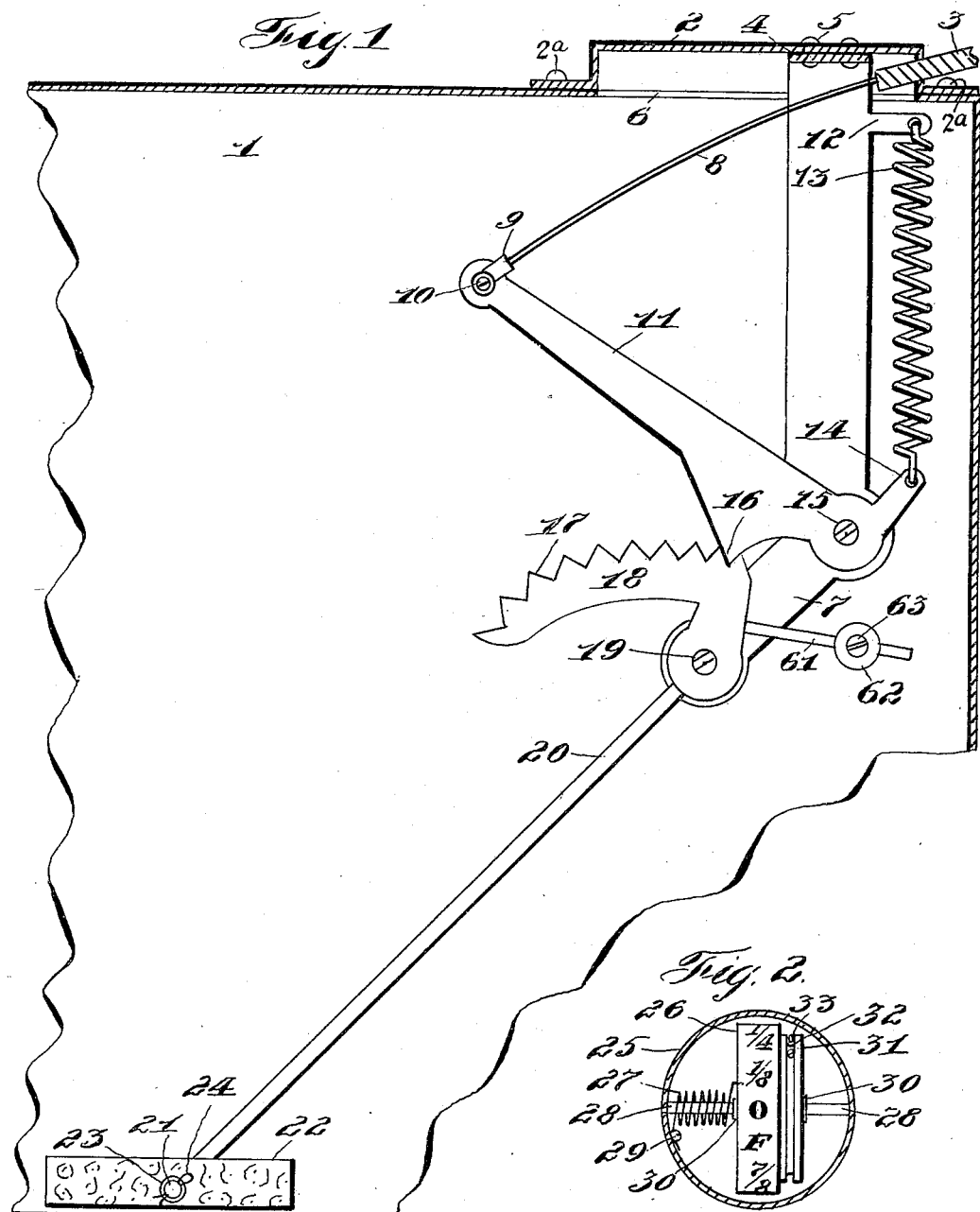
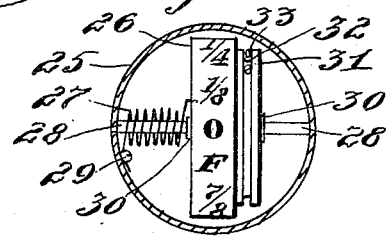
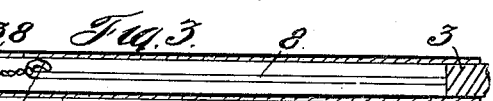
Inventor
William H. Muzzy

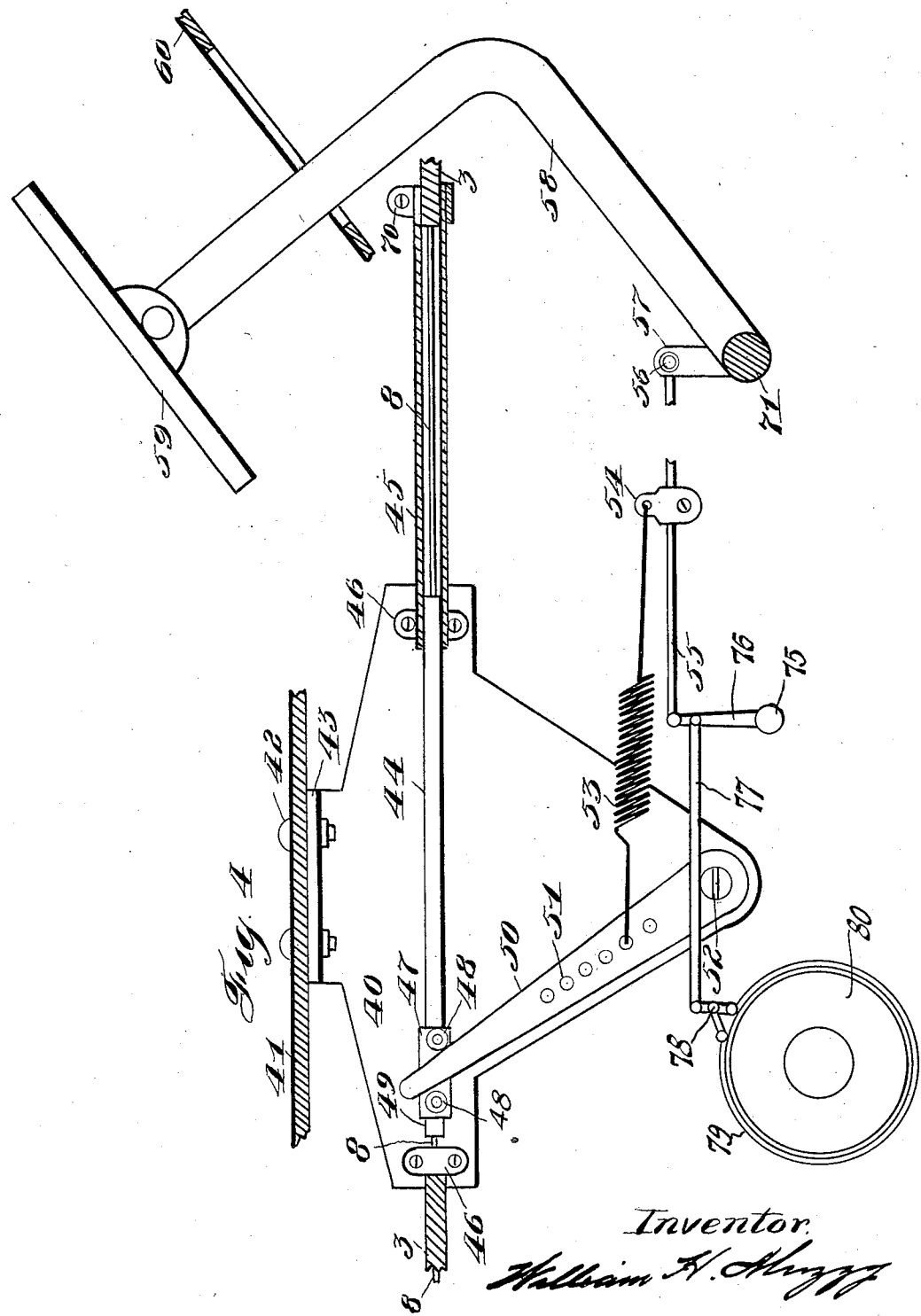

Patented May 17, 1932

1,858,411

UNITED STATES PATENT OFFICE

WILLIAM H. MUZZY, OF EVANSTON, ILLINOIS, ASSIGNOR TO STEWART-WARNER CORPORATION, OF CHICAGO, ILLINOIS, A CORPORATION OF VIRGINIA

AUTOMOBILE LIQUID LEVEL INDICATOR

Application filed June 25, 1923. Serial No. 647,724.

This invention relates to improvements in automobile liquid level indicators and has more particular relation to indicators for automobiles of the so-called "dash" type in which the indicating instrument is located on the instrument board of the machine and the gasoline supply tank is at the back or rear of the machine.

One of the several objects of the present invention is to provide devices for moving the connecting wire or other connecting mechanical element between an indicator and the supply tank, by some one of the several parts associated with the braking mechanism of an automobile whereby the indicator will be reconditioned at the same time that the speed of the machine is reduced to quiet the contents of the fuel tank.

Another object of the invention is to provide improved liquid level gaging elements in which external force is employed to move the several parts independently of the float element.

A further object of the invention is to provide a float controlled depth element having free independent movement, and a spring actuated member normally engaging the depth element and a spring wire connection for the indicator all so arranged and constructed that the wire is under tension when the indicator is being set to a new reading but is not under tension when at rest and controlling the new indication.

The invention also has other objects all of which will be hereinafter more particularly set forth and claimed.

In the accompanying drawings forming part of this specification:

Figure 1 represents a vertical section, partly in elevation and partly broken away, of a gasoline supply tank with my improvements applied thereto;

Figure 2 represents a transverse section, partly in elevation, of the dash instrument or indicator;

Figure 3 represents a detail longitudinal section through this dash instrument and connections; and Figure 4 represents a longitudinal section, partly in elevation, of the gage operating wire and connections, and the brake pedal and brake mechanism of the machine.

In general description it may be said that while a float controlled freely moving depth gage element is old and well known, applicant is not aware of any free moving gage element with a distant indicator and a connecting wire operated by some part of the braking mechanism, or any other mechanism of an automobile that tends to bring the machine to rest and quiet the surface of the contents of the fuel tank from which the reading is taken.

When an automobile is in motion the contents of the fuel tank are in a constant state of agitation and the surface line or level of the fuel is constantly changing at any one given point. This is caused by the uneven surface of the road over which the machine is travelling and this agitation increases or decreases as the speed of the machine is increased or decreased. It is therefore very desirable that any reading of level taken from the surface of the fuel in the fuel tank should be taken when the machine is travelling at a reduced speed. In the present invention this result is automatically secured by reconditioning or resetting the indicator to a new level reading by the same mechanism that tends to bring the machine to a lower speed or in fact stop it entirely if so desired.

There are of course several elements in a car that affect its speed, such for instance as the brake mechanism, the clutch mechanism, the change gear mechanism, etc., but I have selected for illustration the brake mechanism as this mechanism is operated the greatest number of times in normal driving and has the greatest effect on the speed of the machine to quiet the contents of the fuel tank so that a reading of depth may be taken from a float located on the surface of the fuel.

The supply tank 1 is of the regular type located at the rear of the machine. A small cork float 22 located in the tank rises and falls with the level of the gasoline therein.

This float is pivotally mounted on the horizontal part 21 of a rod 20 by means of a thin metal sleeve 23 fast therein, the cork being held in place by a cotter pin 24. The upper end of the rod 20 is soldered fast or otherwise secured to a toothed graduated stop element or plate 18 which is loosely pivoted on a supporting plate 7 by means of a journal screw 19. By the above means the float is free to move and position the plate 18 whenever the latter is released from the locking nose 16 of the locking and actuating lever 11. The plate 18 further carries a rod 61 having a counterbalance weight 62 adjustable thereon by a screw 63. This weight is to counterbalance the weight of the toothed part of the plate and the rod 20 so that a small float may be used and easily operated by the rise and fall of the gasoline in the tank. The teeth 17 of the plate 18 are unevenly spaced, being small and close together at the right and gradually increasing in size and distance between teeth, toward the left. By reference to Figure 1 of the drawings it will be seen that there are ten of these teeth thus leaving nine depressions into which the nose 16 will lock. These nine positions of the plate represent respectively eight equal divisions of the contents of the tank and an indication of empty. These divisions are noted on the dash instrument as follows: E, 1/8, 1/4, 3/8, 1/2, 5/8, 3/4, 7/8, Full.

As shown in Figure 1 the parts are in the position they assume when the tank is empty with the nose 16 in the depression between the first two teeth. The lever 11 is pivoted as at 15 on the plate 7 and is provided with an arm 14 to which is attached one end of a coil spring 13, the other end of this spring being attached to an arm 12 also formed on plate 7. By means of the spring 13 the arm 11 is always under tension and is tending to move downward and is arrested by the nose 16 seating in one or the other of the depressions in the plate 18. The path of travel of the nose 16 about the pivot 15 strikes a circle which lies inside of the pivot 19. The plate 18 and the lever 11 thus form two members of a toggle construction which under the impulse of the spring 13, lock or wedge together in such wise as to prevent any movement of the cork float and its lever or rod 20 except when the lever 11 is drawn upward. The cork float remains in its locked position even though unsupported by the gasoline and when released drops until the cork floats upon the gasoline.

The flexible steel wire 8 is soldered in the block 9 which is pivoted by screw 10 to the end of the lever 11. A pull on this wire will thus draw the lever 11 upward against the tension of the spring 13. This leaves the plate 18 free to assume a position in accordance with the depth of the gasoline in the tank. When the pull on the wire 8 is released the lever 11 is pulled downward by the spring until arrested by contacting with and locking on the plate 18. The wire 8 passes through an enclosing tube 3 formed of a coil of wire, the two making what is generally known as the "Bowden tube." As is well known a tube of this character will leave the operating wire free to move longitudinally while allowing the tube and wire to be passed about obstructions in the way of a free passage from the tank at the rear of the machine to the dash board at the front of the machine. The amount of power required however to overcome the friction between the wire and the tube and move the wire through about fourteen feet of tube is more than may be ordinarily supplied by a float alone in the tank.

The tube 3 at the rear passes through the wall of a cap 2 and is soldered fast thereto. This cap is secured on the tank over an opening 6 therein by rivets 2a. The plate or support 7 is bent at an angle at its top and secured to the under side of the top 2, as at 4, by rivets 5.

The tube 3 is secured to the frame or body of the car in any desirable manner and passes forward to a plate 40 which latter is secured under the floor 41 of the car by bolts 42. The tube is secured to the plate by a clip 46, the wire 8 beyond the clip being soldered in a block 49 formed on a square block 47 having two anti-friction rollers 48 on one side thereof. The block 47 carries a solid stem 44 one end of which projects into a tube 45 secured by clip 46 to the plate 40. The forward end of the tube 45 is split and is forced together to clamp the forward tube 3 by a hose clamp 70, the forward wire 8 passing through the tube and being soldered in the forward end of the stem 44. By this means the movement of the block 47 back and forth will move the wires 8 back and forth correspondingly. A lever 50 pivoted as at 52 on plate 40 projects upward between the rollers 48. As this lever is oscillated it forces the stem 44 back and forth. The lever is actuated by the brake rod 55 having a clip 54 which is connected to one end of a coil spring 53, the opposite end of the spring being hooked into one of a series of apertures 51 in the lever 50. As the upper end of the lever 50 must have about three inches of travel or better and as the brake rods of different machines travel different distances, the spring 53 is hooked into the proper hole 51 in the lever to secure this result. If the movement of the brake rod is too much, the spring is moved into the upper hole 51 and if it still has a surplus of movement the spring 53 will expand after the lever has come to rest. The forward end of the rod 55 is pivoted at 56 to an arm 57 fast on a rock shaft 71. This shaft also carries the angular brake pedal lever 58 which passes through a slot in the floor board 60 and is provided with a foot pedal 59. The rear end of the rod 55 is connected to the usual brake equalizing jack shaft 75 by an arm 76 which is in turn connected by rod 77 to toggle 78 of the usual construction operating on the brake band 79 to cause it to engage the brake drum 80.

It will be seen from the above that every time the brake is operated the lever 50 is operated and moves the wire 8 or gives it a pull forward. Just a slight movement of the wire (as when the brake is applied lightly) will be sufficient to disengage the nose 16 from the plate 18. The plate 18 then takes up a new position according to the level of the quieted gasoline in the tank and as the brake is released is again locked in position.

The forward end of the forward tube 3 is soldered in the rear end of a tube 38. The forward end of this tube is adjustably secured to an extension 36 of the gage casing 25, by a screw 37. This allows the tube 36 to be set back or forth in the tube 38 to adjust the indicator wheel 26 to the proper position when the device is first installed. This result may be also secured by adjusting the tube 3 back and forth in the forward end of the tube 45, or the rear tube 3 under the clip 46.

The forward end of the forward wire 8 is bent into a hook 39 which plays back and forth in the solid tube 38. A chain 33 is hooked over this hook and passes forward into the casing 25 from the rear. This casing is mounted by a flange 34 in any desired position in the instrument board so that the numerals on the wheel 26 may be clearly seen through an opening 35 in the front of the casing. The chain 33 passes about a grooved wheel 31 soldered fast to wheel 26 and is secured to this grooved wheel by a pin 32. Both of the wheels 26 and 31 are broached or forced fast on a shaft 28 and are supported in place by washers 30 also broached on the shaft. The ends of the shaft 28 are pivoted in the casing 25. The wheel 26 is connected to one end of a coil spring 27, the opposite end of this spring being secured to the casing 25 by a screw 29. When the wheel 26 is rotated to indicate 0 as in Figure 2, the coil spring is wound up so when the chain 33 is allowed to rewind on the drum 31, the spring moves the drum and wheel in the proper direction.

It will be understood that this device is particularly adapted for use with different depths of tanks as the whole apparatus remains the same for different tanks with the exception of the plate 18 and its attachments. There is a different one of these plates for each depth of tank but in each case nine indications for the tank are still used. In other words all tanks are divided into eighths of contents no matter what their shape may be or what their depth.

Applicant with the present invention is trying to provide a reliable dash gage which while it does not indicate in gallons may be made to do so if desired. The reliability of the device is founded on the fact that no small uncertain float is employed to move a wire through a tube but the wire is moved in one direction by the power of the brake pedal and in the other by a powerful spring. Further reliability is established because of the feature of locking all the parts rigidly in position except when the brake is being operated. This results in a minimum of wear of the wire and other parts. Without the locking feature the constant surge of the gasoline in the tank will keep the parts constantly moving because of road vibrations.

Further reliability is added because at the time when the devices are indicating the wire 8 lies in its normal state in the tube 3 without stretch or strain which would distort the tube 3 and cause a wrong indication. It is only when the parts are being reset that there is a temporary strain on the wire and any distortion of the tube 3 at this time will be immediately corrected when the strain is released by letting up on the brake pedal. It will of course be understood that the clutch pedal, the change gear lever or any other part of the machine that has direct control of the speed of the car could also be used to operate the gage wire as these parts have a controlling influence on the agitation of the fuel in the fuel tank.

It will be understood that the location of the respective pivots 15 and 19 is such that the spring impulse of the nose 16 is to engage one of the teeth, 17, and rotate the plate 18 toward the right and thus form a powerful toggle or double lever to jam the parts 18 and 11 in position against any possible derangement by the vibrations of the road or the float 22 which latter at times is unsupported by the gasoline.

Having thus described my invention what I claim as new and desire to secure by Letters Patent is:

1. In an automobile the combination with a fuel supply tank, of a depth indicating gage, a pivoted stop element in the tank having teeth disposed in a series eccentric to the pivot of the element, a float controlled means to rotatably position the stop element, a member having a projection for selectively engaging a tooth on the stop element, a wire and connections between the member and the gage, a spring for moving the member and thereby the connections and the wire in a direction such as to engage the member projection with the stop element tooth, a brake mechanism for arresting the speed of the automobile and a common means for operating the brake mechanism and moving the wire against the tension of the spring.

2. In an automobile the combination with a fuel supply tank, of a depth indicating gage, a pivoted stop element in the tank having a stop edge eccentric to its pivot, a float controlled means to rotatably position the stop element, a pivoted lever having a projection for engaging the eccentric stop edge of the stop element at different points to jam the lever and stop together and against their respective pivots, a wire and connections between the lever and the gage, a spring for moving the lever and thereby the connections and the wire in a direction such as to engage the lever projection with the stop element, a brake mechanism for arresting the speed of the automobile, and a common means for operating the brake mechanism and moving the wire against the tension of the spring.

3. In an automobile the combination with a fuel supply tank, of a depth indicating gage, a pivoted stop element in the tank having teeth disposed in a series eccentric to the pivot of the element, a float controlled means to rotatably position the stop element, a pivoted lever having a projection for selectively engaging a tooth on the stop element, a wire and connections between the lever and the gage, a spring for moving the lever and thereby the connections and the wire in a direction such as to engage the lever projection and the stop element tooth and jam the two together, a brake mechanism for arresting the speed of the automobile and a common means for operating the brake mechanism and moving the wire against the tension of the spring.

In testimony whereof I affix my signature.

WILLIAM H. MUZZY.